(12) United States Patent
Johnson et al.

(10) Patent No.: US 7,380,087 B2
(45) Date of Patent: May 27, 2008

(54) RECLAIMING APPLICATION ISOLATED STORAGE

(75) Inventors: Bruce E. Johnson, Bellevue, WA (US); Pavel S. Treskunov, Redmond, WA (US); Seth M. Demsey, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 303 days.

(21) Appl. No.: 10/925,545

(22) Filed: Aug. 25, 2004

(65) Prior Publication Data

US 2006/0047922 A1    Mar. 2, 2006

(51) Int. Cl.
*G06F 12/00* (2006.01)
(52) U.S. Cl. .................. 711/170; 711/165; 707/206
(58) Field of Classification Search .................. None
See application file for complete search history.

(56) References Cited

U.S. PATENT DOCUMENTS

| | | | |
|---|---|---|---|
| 5,652,883 A | 7/1997 | Adcock | |
| 6,094,664 A * | 7/2000 | Ungar | 707/206 |
| 6,282,621 B1 | 8/2001 | Parsons | |
| 6,353,838 B2 | 3/2002 | Sauntry et al. | |
| 6,622,226 B1 | 9/2003 | Dussud | |
| 6,675,257 B1 | 1/2004 | Khalid et al. | |
| 6,738,969 B2 * | 5/2004 | Bak et al. | 717/158 |
| 7,120,750 B1 * | 10/2006 | Seidl et al. | 711/133 |
| 2001/0042058 A1 * | 11/2001 | Harrington et al. | 707/1 |
| 2005/0028140 A1 * | 2/2005 | Ayachitula et al. | 717/116 |

* cited by examiner

*Primary Examiner*—Reginald G. Bragdon
*Assistant Examiner*—Ngoc V Dinh
(74) *Attorney, Agent, or Firm*—Lee & Hayes, PLLC (57) ABSTRACT

Relatively-temporary applications may be installed. As a result of the installation and/or execution of such an application, an associated application isolated storage unit may be established. When established, the application isolated storage unit is designated for private storage use by the associated application. Additionally, a linkage between the application isolated storage unit and the associated application is created. Upon initiation of a reclamation procedure, the linkage from the application isolated storage unit is traced to the indicated location of the associated application. If the associated application no longer exists, the application isolated storage unit is deleted so as to reclaim the memory space.

36 Claims, 7 Drawing Sheets $\mathcal{FIG}. 1$

RECLAIMING APPLICATION ISOLATED STORAGE

TECHNICAL FIELD

This disclosure relates in general to application isolated storage and in particular, by way of example but not limitation, to reclaiming application isolated storage after an application is uninstalled.

BACKGROUND

Portable devices include mobile phones, personal digital assistants (PDAs), portable gaming devices, and so forth. Portable devices are usually capable of communicating over a network to download additional programs. Examples of such programs include document reader programs, web-based programs, games, and so forth. The number of available programs is large and constantly growing. Unfortunately, the ability of a given device to download, store, and run programs is not similarly unlimited. Furthermore, the amount of data that can be stored for such programs and/or for the user is also limited.

In fact, portable devices are often considered resource constrained devices because they have fewer resources and/or lower amounts of given resources as compared to non-portable devices, which are typically larger and usually connected to relatively infinite power sources. Some non-portable devices, such as television set-top boxes and so-called low-end personal computers, are also usually considered resource constrained. By way of example, resource-constrained devices often have much less memory than their non-resource-constrained counterparts. Consequently, frequent downloading of programs can cause the memory of a resource-constrained device to become depleted quickly.

Accordingly, there is a need for schemes and/or techniques that can enable the efficient and/or relatively-seamless management of the memory of devices, including the memory of portable and other resource-constrained devices.

SUMMARY

Relatively-temporary applications may be installed. As a result of the installation and/or execution of such an application, an associated application isolated storage unit may be established. When established, the application isolated storage unit is designated for private storage use by the associated application. Additionally, a linkage between the application isolated storage unit and the associated application is created. Upon initiation of a reclamation procedure, the linkage from the application isolated storage unit is traced to the indicated location of the associated application. If the associated application no longer exists, the application isolated storage unit is deleted so as to reclaim the memory space.

Other method, system, approach, apparatus, device, media, procedure, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Introduction

A device can download applications that it keeps resident in its memory for a limited time. A continuing cycle of many such relatively temporary applications involves repeated installations and uninstallations of applications. Although temporary, these applications still utilize memory space for storing application-related data. Eventually, the stored application-related data may occupy a large amount of memory. Even after applications that create associated application-related data have been uninstalled, the abandoned application-related data remains and may consume an unacceptable amount of memory. Some applications may attempt to remove their data when uninstalled, but many do not or are unsuccessful in the attempt. Some orphaned data may be manually removed, but such options are limited, time-consuming, and often incomplete.

In a described implementation, linkages between an application and its associated data are established. More specifically, a linkage from the application-related data to the associated application is established. Subsequently, storage areas having such application-related data are analyzed using the linkages. For each given application-related data unit having a linkage that does not trace back to an associated application, the given application-related data is removed. In this manner, application-related data that is associated with an application that has been uninstalled can be prevented from occupying storage space indefinitely.

Example Situation of Application Downloading to a Device

Figure 1:
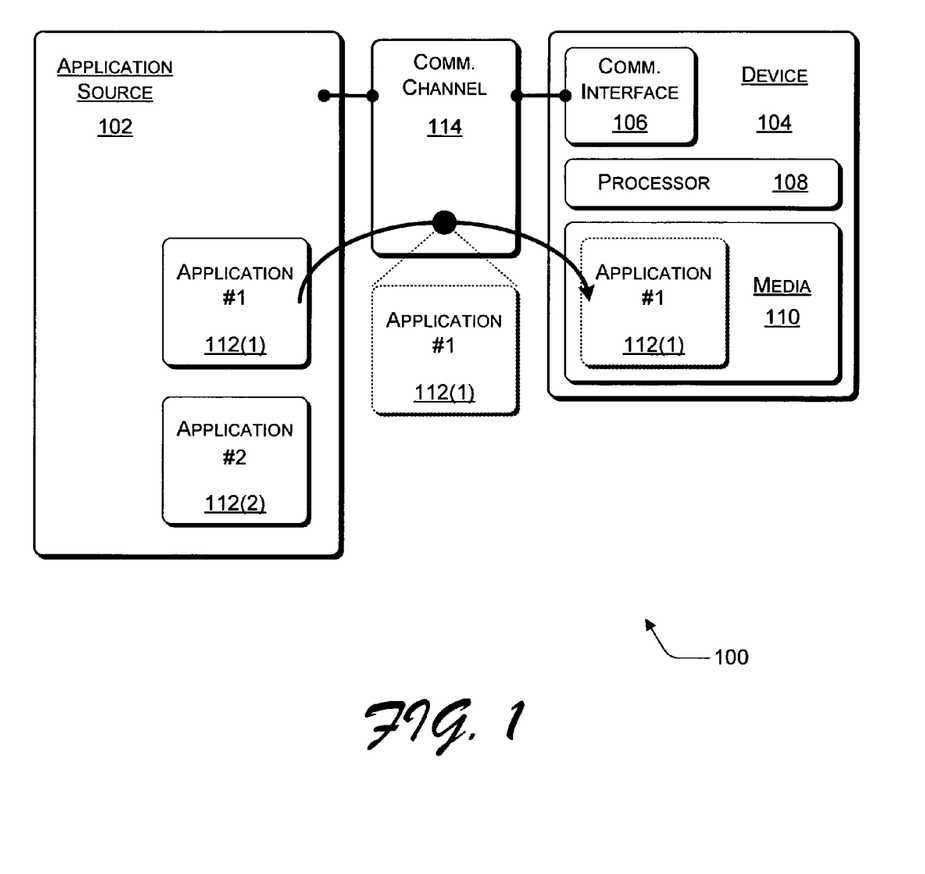
FIG. 1 is a block diagram illustrating an example situation in which a device is downloading an application from an application source.

FIG. 1 is a block diagram 100 illustrating an example situation in which a device 104 is downloading an application 112(1) from an application source 102. Application source 102 can provide one or more of possibly many applications 112. Application source 102 is adapted to provide application 112(1) to device 104 over a communication channel 114 for storage at and utilization by device 104.

As shown, application source 102 includes application #1 112(1) and application #2 112(2). However, application source 102 may include more or fewer than two applications 112. Furthermore, although only one application source 102 is shown, any given device 104 may download applications 112 from many different application sources. By way of example only, application source 102 may be an internet site, a telecommunications provider, another device, and so forth.

As illustrated, device 104 includes one or more processors 108, at least one media 110, and a communication interface 106 that is coupled to communication channel 114. Media 110 typically includes processor-executable instructions that are executable by processor 108 to effectuate functions of device 104.

Media 110 may be realized as storage or transmission media, volatile or non-volatile media, removable or non-removable media, some combination thereof, and so forth. For example, media 110 may be realized as (i) a volatile random access memory (RAM), (ii) a non-volatile disk-based or flash type memory, (iii) a transmission medium, and/or (iv) a propagating signal.

Communication channel 114 may be comprised of one or more wireless and/or wired links that directly interconnect application source 102 and device 104 or that indirectly interconnect them across one or more networks (not explicitly shown). Additional details and examples of devices, processors, media, communication mechanisms, and so forth are described further below with reference to FIG. 7.

In a downloading operation, application source 102 stores application 112(1). Upon request, application source 102 transmits application 112(1), including a copy thereof, across or onto communication channel 114. Application 112(1) propagates along communication channel 114. Device 104 receives application 112(1) from communication channel 114 via communication interface 106. Upon receipt, device 104 stores application 112(1) in a memory implementation of media 110.

After or during downloading, device 104 may install application 112(1) so that it may be executed on device 104. Device 104 may execute application 112(1) in any environment. In a described implementation however, device 104 executes application 112(1) in a common language runtime (CLR), managed code, or other controlled environment. For example, device 104 may execute application 112(1) in a so-called "sandbox" environment. This controlled execution environment is especially pertinent when a system is to restrict the ability of un-trusted applications to perform certain computing functions.

In such a controlled environment, application 112(1) is usually given only limited access to the features and/or resources of device 104. For example, device 104 may grant application 112(1) access to only a designated portion of a memory implementation of media 110. The designated memory portion may be realized as private storage space that is allocated to given application. As used herein, such a designated portion of memory is referred to as application isolated storage. An example of application isolated storage, as well as linkages to associated applications, is described further herein below with particular reference to FIGS. 2 and 4.

Reclaiming Application Isolated Storage

Figure 2:
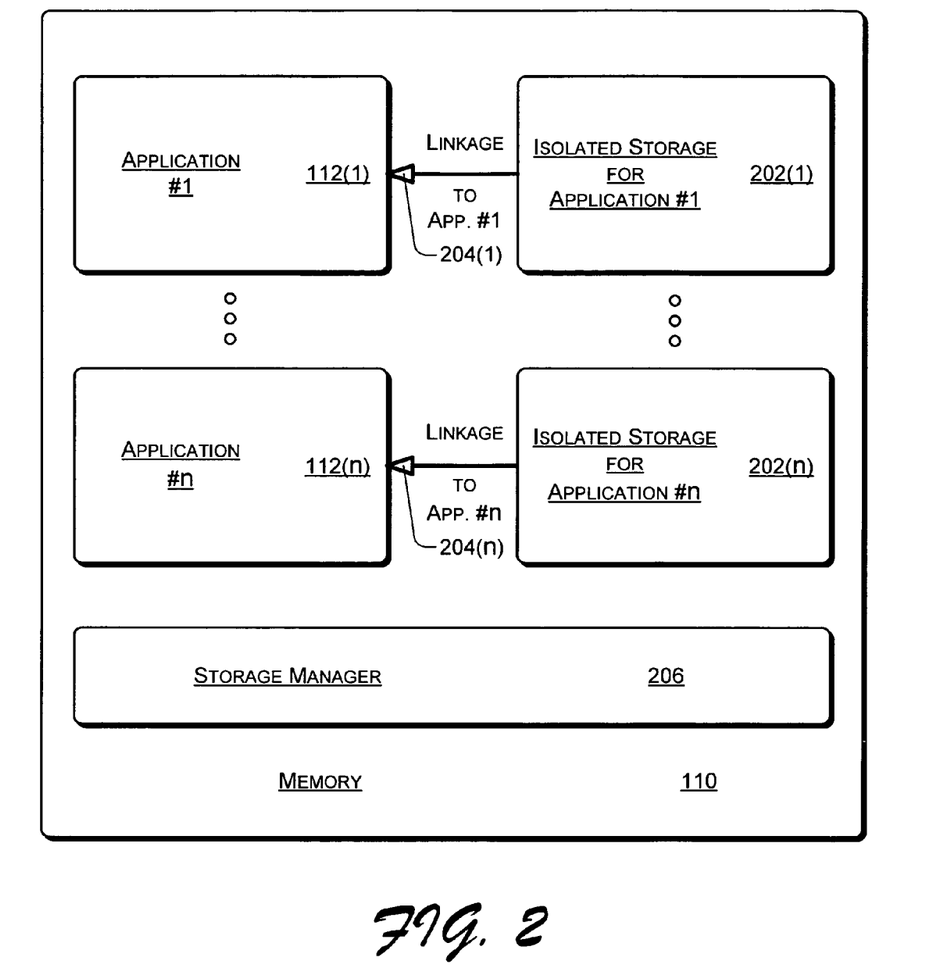
FIG. 2 is a block diagram illustrating an example of a memory having application isolated storage that also indicates linkages to associated applications.

FIG. 2 is a block diagram illustrating an example of a memory 110 having application isolated storage 202 that also indicates linkages 204 to associated applications 112. Memory 110 is an implementation of media 110 (of FIG. 1). Memory 110 may be RAM, a disk-based memory, a flash memory, some combination of one or more thereof, and so forth.

As illustrated, memory 110 includes isolated storage for application #1 202(1), application #1 112(1), isolated storage for application #n 202(n), application #n 112(n), and storage manager 206. Although only two applications 112 and two associated application isolated storages 202 are shown, memory 110 may actually contain many such applications 112 and associated application isolated storages 202.

Although not specifically indicated, application isolated storages 202 may optionally be located together in one area of memory 110. Furthermore, although not required, a particular application 112 and its associated particular application isolated storage 202 are preferably located on the same storage volume or root. For example, in a described implementation, a distinction is drawn between so-called removable media 110 and non-removable media 110. If an application 112 is installed on removable media, then its associated application isolated storage 202 is located on the same removable media. Consequently, portability between different "hosting" devices 104 is enabled while the application isolated storage 202 is preserved in the absence of the removable media. An example of a root tree hierarchy is described further herein below with particular reference to FIG. 5.

In a described implementation, when an application 112 is installed and isolated storage 202 therefor is established, storage manager 206 creates a linkage 204 therebetween. Specifically, a linkage 204 from application isolated storage 202 to its associated application 112 is created. Although illustrated as a one-way linkage from application isolated storage 202 to associated application 112, linkages 204 may alternatively be two-way to enable tracing of the linkage from application 112 to its associated application isolated storage 202. Regardless, an application 112 is capable of accessing its associated application isolated storage 202 via a two-way linkage 204 or through some other mechanism if a one-way linkage 204 is utilized. Additionally, although linkages 204 are pictured as being on memory 110, linkages 204 may actually be located in a different memory and/or stored in a different manner.

Storage manager 206 thus binds application isolated storages 202 to their associated applications 112 (and optionally vice versa). Storage manager 206 provides for a self-managing temporary storage data system based on application identity. The created linkages 204 may be realized in any of many possible forms. For example, storage manager 206 may establish a table that links application isolated storages 202 to their associated applications 112. The table may include multiple entries that are organized by application isolated storages 202. For instance, each entry may correspond to a particular application isolated storage 202 and include a link to the particular associated application 112.

As another example, storage manager 206 may create linkages 204 by using references from application isolated storages 202 to associated applications 112. These references may be implemented as pointers stored in proximity to, or as part of, application isolated storages 202. The reference implementation is described further herein below with particular reference to FIGS. 4 and 5.

Although reclaiming application isolated storage is described primarily at an application level of granularity, each application 112 may be comprised of multiple assemblies. Each assembly may therefore have its own application assembly isolated storage unit. Thus, the unit of storage isolation may be at the application assembly level of granularity. Storage manager 206 may therefore provide for a self-managing temporary storage data system based on application assembly identity.

Figure 3:
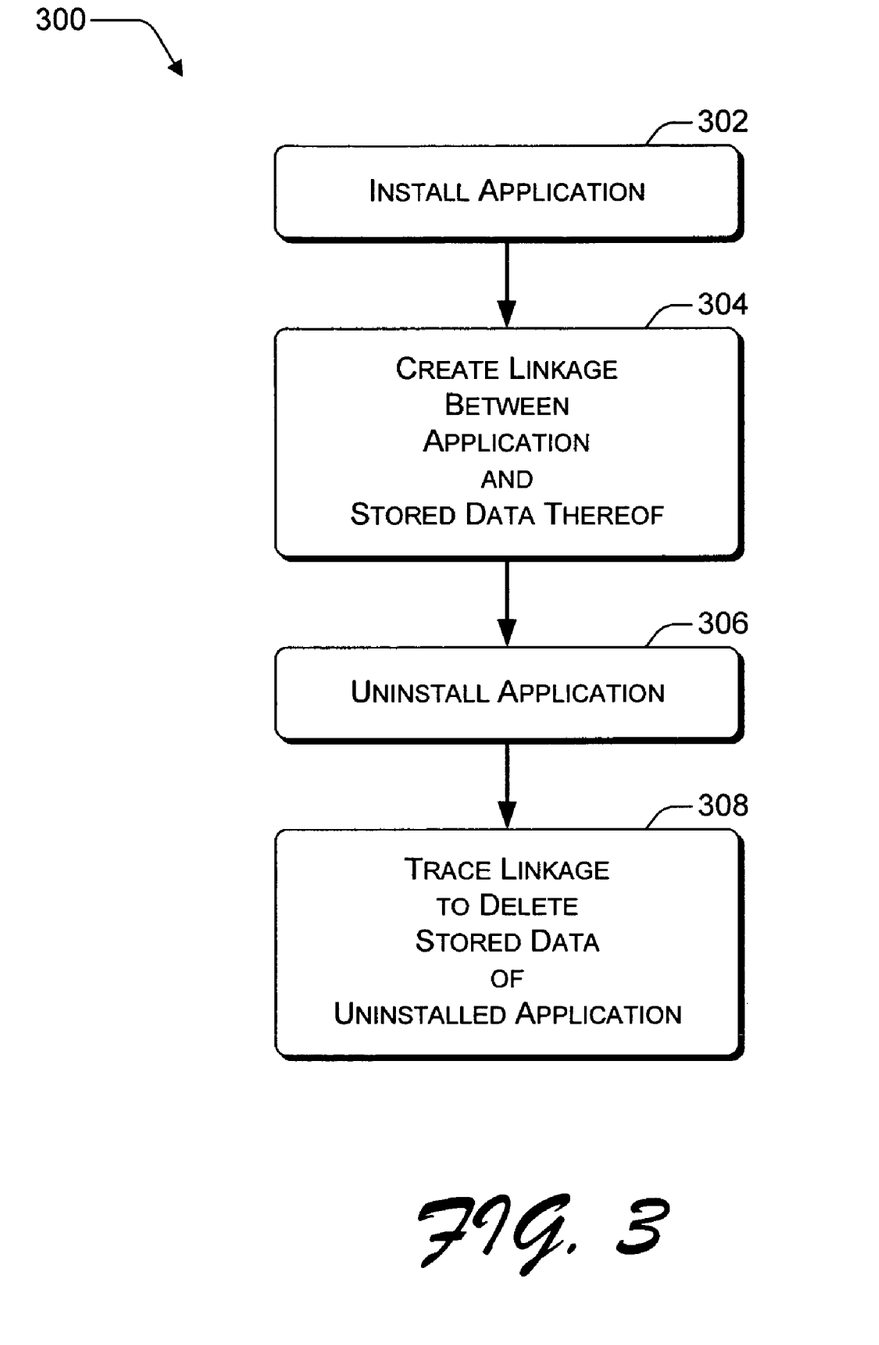
FIG. 3 is a flow diagram that illustrates an example of a method for reclaiming application isolated storage.

FIG. 3 is a flow diagram 300 that illustrates an example of a method for reclaiming application isolated storage. Flow diagram 300 includes four (4) blocks 302-308. Although the actions of flow diagram 300 may be performed in other environments and with a variety of hardware and software combinations, FIGS. 1-2 are used in particular to illustrate certain aspects and examples of the method.

Flow diagram 300 represents a life cycle of an application 112 and its associated application isolated storage 202 in a self-managing temporary storage data system that removes abandoned storage units based on application identity. More specifically for a described implementation, a self-managing temporary storage data system removes abandoned storage units based on application assembly availability or existence (e.g., for an assembly level of granularity implementation). At block 302, an application is installed. For example, a device 104 may install an application 112(n). At block 304, a linkage is created between the application and stored data thereof. For example, a storage manager 206 of device 104 may create a linkage 204(n) between application 112(n) and its associated application isolated storage 202(n).

At block 306, the application is uninstalled. For example, device 104 may uninstall application 112(n). At block 308, the linkage is traced to delete the stored data of the uninstalled application. For example, linkage 204(n) may be traced to application 112(n), and because application 112(n) is uninstalled, its associated application isolated storage 202(n) may be deleted. More specifically, linkage 204(n) is traced by storage manager 206 to attempt to locate application 112(n). If application 112(n) is located, its associated application isolated storage 202(n) is not deleted. If, on the other hand, storage manager 206 fails to locate application 112(n), its associated abandoned application isolated storage 202(n) is deleted.

Linkages Implemented as References

Figure 4:
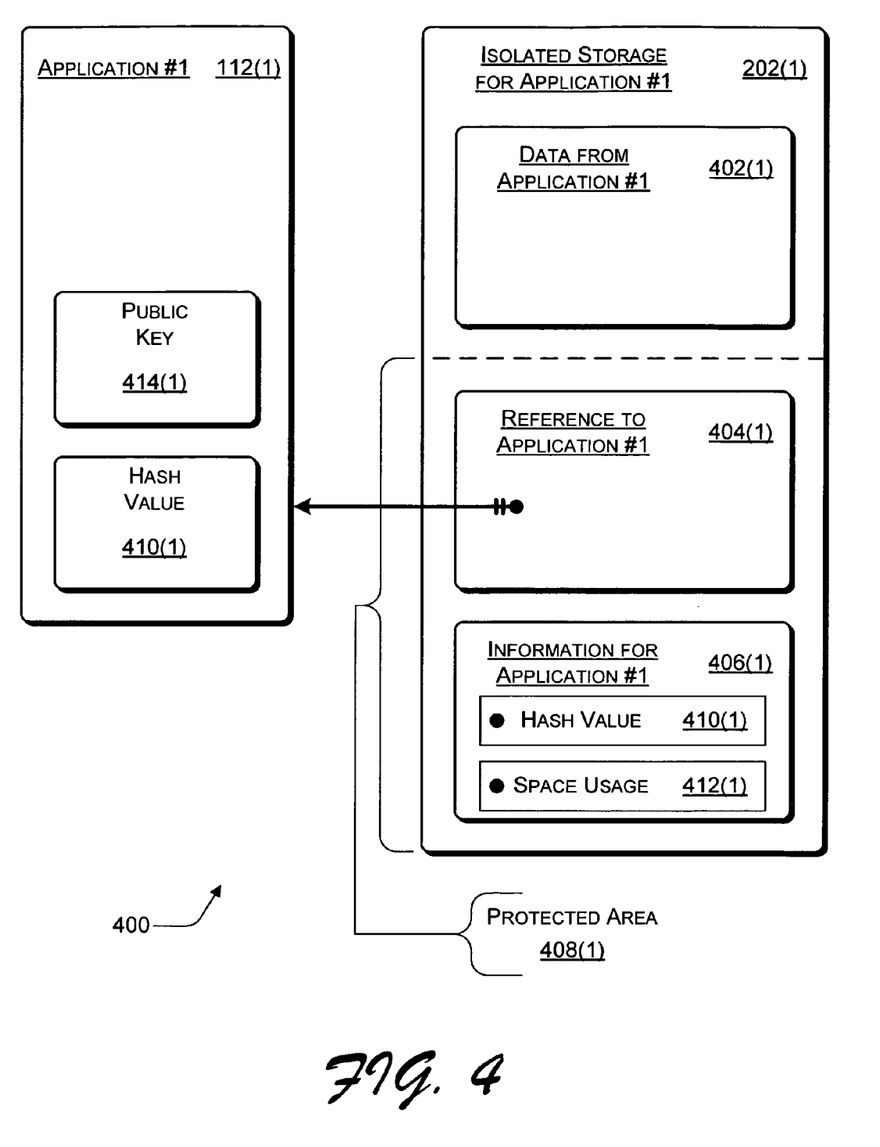
FIG. 4 is a block diagram that illustrates an example of a linkage between an isolated storage unit and an associated application.

FIG. 4 is a block diagram 400 that illustrates an example of a linkage between an isolated storage unit 202(1) and an associated application 112(1). Specifically, application #1 112(1) is shown along with isolated storage for application #1 202(1). As illustrated, application isolated storage 202(1) includes data from application #1 402(1), reference to application #1 404(1), and information for application #1 406(1). Application information 406(1) includes hash value 410(1) and space usage 412(1). Also, application #1 112(1) includes a public key 414(1) and hash value 410(1).

The linkage is implemented as application reference 404(1). Application reference 404(1) provides a reference to application 112(1). For example, application reference 404(1) may be a pointer that identifies the location of application 112(1). Application information 406(1) includes optional information, such as hash value 410(1), space usage 412(1), and possibly other information.

Hash value 410(1) is an optional hash of application 112(1) that can be used to enhance the binding between application 112(1) and application isolated storage 202(1). By way of example only, hash values can be calculated using a Secure Hash Algorithm (SHA)-type hash, which is a cryptographic function that produces a 16-byte quantity. Space usage 412(1) is an optional current memory usage of application 112(1), which may be relevant when a system is enforcing quotas for storage space occupied by application 112(1).

Application data 402(1) is data produced by application 112(1) while application 112(1) is being executed. Moreover, application data 402(1) can be data that application 112(1) wants to have persisted even when application 112(1) is not currently being executed. By way of example only, if application 112(1) is a game, application data can be saved game information such as a game position, accumulated items/abilities, a high score collection, and so forth.

Application data 402(1) is therefore created by application 112(1) as one or more files. Application reference 404(1) and application information 406(1), on the other hand, are created by storage manager 206 (of FIG. 2). Additionally, in a described implementation, application isolated storage 202(1) includes a protected area 408(1). This protected area 408(1), which includes application reference 404(1) and application information 406(1) (and possibly other information and/or files), is not accessible to application 112(1). Access to protected area 408(1) by application 112(1) can be prevented in a myriad of fashions. For example, application programming interfaces (APIs) for application isolated storage 202 that are exposed to applications 112 may only enable access to a subset of files (e.g., data from applications 402) located in application isolated storage 202.

Although area 408(1) is "protected" in an implementation described with reference to FIG. 4, it is an optional aspect of reclaiming application isolated storage as described herein. For example, if linkages 204 between applications 112 and their associated application isolated storages 202 are created with a stored table (e.g., or a reference that is not located in the application isolated storage 202 area), the table storage area can be protected while the application isolated storages 202 need not be.

In operation, storage manager 206 adds at least application reference 404(1) to application isolated storage 202(1). Application reference 404(1) may be added to application isolated storage 202(1) when application 112(1) is installed, when application 112(1) first stores data at application data 402(1), and so forth. When storage manager 206 is performing a reclaiming procedure, it analyzes application isolated storage 202(1) to locate application reference 404(1).

Storage manager 206 extracts the reference from application reference 404(1) and traces it to find the location at which application 112(1) is expected to be. If application 112(1) is found, application isolated storage 202(1) is permitted to continue to persist. If application isolated storage 202(1) is not found at the referenced location, storage manager 206 deletes application isolated storage 202(1).

The reclaiming procedure performed by storage manager 206 can be initiated in a variety of manners and can be precipitated by any of many possible events. For example, the reclaiming procedure can be initiated when any application (or at least any application with application isolated storage 202) is uninstalled, can be initiated by the system at regular time intervals, can be initiated manually by a user of the device, can be initiated if a requested application installation fails (including would fail) because of lack of memory, and so forth.

Figure 5:
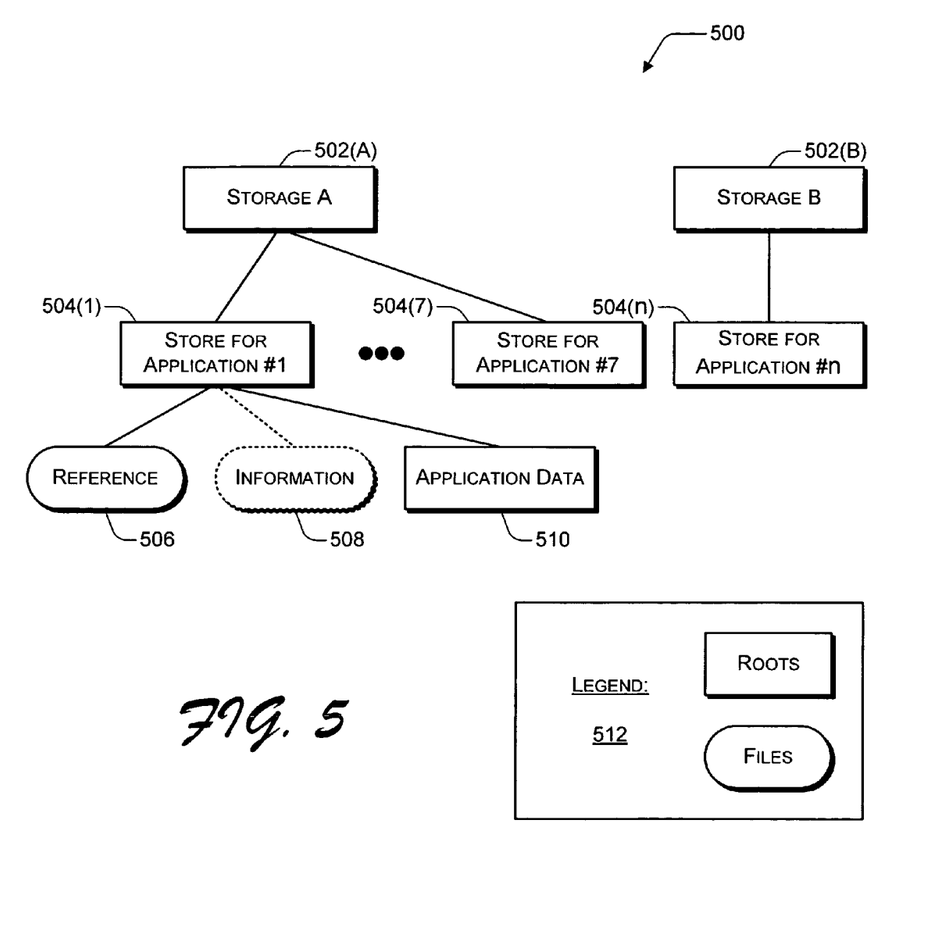
FIG. 5 is an example of a root tree hierarchy for two storage roots.

FIG. 5 is an example of a root tree hierarchy 500 for two storage roots 502(A) and 502(B). As indicated by legend 512, rectangles represent roots and ovals represent files. As illustrated, root tree hierarchy 500 includes two storage roots 502, "n" application root stores 504, two files 506 and 508, and an application data root 510. However, different numbers of roots and files may alternatively form any given root tree hierarchy 500. Although not required, each application isolated storage 202 is typically allocated from the same storage volume or storage root 502 at which the associated application 112 is installed.

In a described implementation, each storage root 502 corresponds to a storage volume. For example, storage A 502(A) may be a built-in disk-based type of storage, and storage B 502(B) may be a removable flash memory type of storage. Each application root store 504 corresponds to a private storage unit for its corresponding application 112 (of FIGS. 1, 2, and 4). Thus, seven applications (e.g., applications 112(1-7)) have been installed on storage root A 502(A) as indicated by application root stores 504(1) . . . 504(7). Also, one application (e.g., application 112(n)) has been installed on storage root B 502(B) as indicated by application root store 504(n).

Three items are located under store for application #1 root 504(1) in root tree hierarchy 500. These three items are two files 506 and 508 and one root 5100. These items are reference 506, (optional) information 508, and application data root 510. Reference 506 corresponds to application reference 404(1) (of FIG. 4), and information 508 corresponds to application information 406(1) (of FIG. 4). Application data root 510 corresponds to application data 402(1). Hence, application 112(1) may store as many files and/or folders under application data root 510.

In a described implementation, storage manager 206 traverses root tree hierarchy 500 when performing a reclaiming procedure. For each application root store 504 that storage manager 206 encounters, storage manager 206 extracts a reference from application reference 404(1) as indicated by the reference file 506.

An example of root tree hierarchy 500 in text form follows:

```
<Root-of-the-Storage (A)>
    <Root-of-the-Application-Store (#1)>
        Reference File
        Information File
        <Root-of-the-Application-Data>
    ...
    <Root-of-the-Application-Store (#7)>
<Root-of-the-Storage (B)>
    <Root-of-the-Application-Store (#n)>
```

Figure 6:
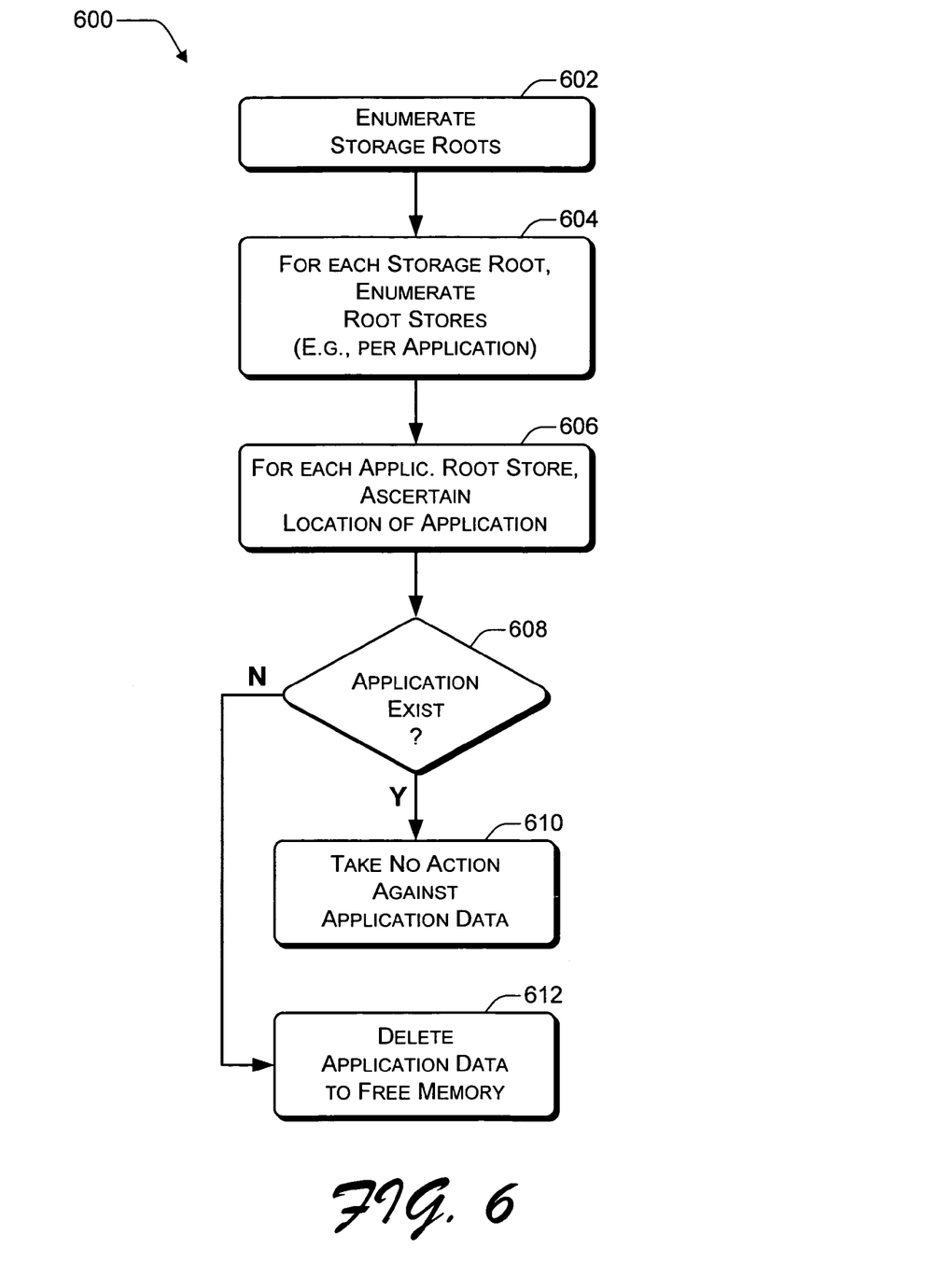
FIG. 6 is a flow diagram that illustrates an example of another method for reclaiming application isolated storage with respect to a root tree hierarchy for one or more storage roots.

FIG. 6 is a flow diagram 600 that illustrates an example of another method for reclaiming application isolated storage with respect to a root tree hierarchy for one or more storage roots. Flow diagram 600 includes six (6) primary blocks 602-612. Although the actions of flow diagram 600 may be performed in other environments and with a variety of hardware and software combinations, FIGS. 1-2 and 4-5 are used in particular to illustrate certain aspects and examples of the method. Flow diagram 600 is directed to traversing a root tree hierarchy and analyzing application isolated storages that are discovered thereon by a storage manager.

At block 602, storage roots are enumerated. For example, storage roots 502(A) and 502(B) of a root tree hierarchy 500 may be enumerated. For instance, different physical fixed or removable storage volumes of a device 104 may be enumerated.

At block 604, for each enumerated storage root, the root stores thereof are enumerated (e.g., on a per-application basis). For example, application root stores 504(1-7) of root tree hierarchy 500 may be enumerated. These application root stores 504(1-7) may correspond, for instance, to applications 112(1-7), respectively.

At block 606, for each enumerated application root store, the location of the application is ascertained. For example, under application root store #1 504(1), storage manager 206 may find reference file 506. From reference file 506, storage manager 206 may extract application reference 404(1), which comprises the location of application 112(1).

At block 608, it is determined if the application exists. In other words, it is determined if an application associated with the application isolated storage of the application root store being analyzed still exists. For example, storage manager 206 may determine if application 112(1) exists at the location identified by application reference 404(1). Verification of application 112(1) may be effectuated with hash value 410(1). The verification of its existence can be facilitated using public key 414(1) in a public key infrastructure (PKI) type cryptographic analysis.

If it is determined (at block 608) that "Yes" the application still exists, then at block 610 no action is taken against the application data. If, on the other hand, it is determined (at block 608) that "No" the application does not exist, then at block 612 the application data is deleted to free memory space. For example, storage manager 206 may delete the application isolated storage 202(1) that is associated with application 112(1) and that is represented on root tree hierarchy 500 by application root store 504(1). The memory space previously consumed by application isolated storage 202(1) is thus made available to the system for allocation to new requesters. After the entire root tree hierarchy 500 is traversed by storage manager 206, any abandoned application isolated storages 202 are deleted to release their memory for reuse by the system.

In an optional implementation, applications 112 may be migrated from one version to another without risking that their associated application isolated storage 202 will be reclaimed. For example, when upgrading an application 112 by replacing an existing version with an upgraded version, the system is adapted to update application reference 404(1) to point to the installed upgraded version. However, unless manual overrides are made available, uninstalling an older application 112(O) and then installing a new application 112(N) risks deletion of the application isolated storage 202 of the uninstalled older application 112(O).

The implementations above have been described in terms of applications. However, reclaiming application isolated storage as described herein can be effectuated in the context of executables generally. Executables include applications, libraries, and so forth. Thus, for example, any given executable may have associated executable isolated storage established therefor and a link therebetween may be created by storage manager 206. Furthermore, each executable may be comprised of one or more assemblies.

The devices, actions, formats, aspects, features, procedures, components, etc. of FIGS. 1-6 are illustrated in diagrams that are divided into multiple blocks. However, the order, interconnections, interrelationships, layout, etc. in which FIGS. 1-6 are described and/or shown is not intended to be construed as a limitation, and any number of the blocks and/or other illustrated parts can be modified, combined, rearranged, augmented, omitted, etc. in any manner to implement one or more systems, methods, devices, procedures, media, apparatuses, arrangements, etc. for the reclaiming of application isolated storage. Furthermore, although the description herein includes references to specific implementations (including the general device of FIG. 7 below), the illustrated and/or described implementations can be implemented in any suitable hardware, software, firmware, or combination thereof and using any suitable memory architecture(s), memory type(s), linkage realization(s), execution environment(s), storage management paradigm(s), and so forth.

Example Operating Environment for Computer or Other Device

Figure 7:
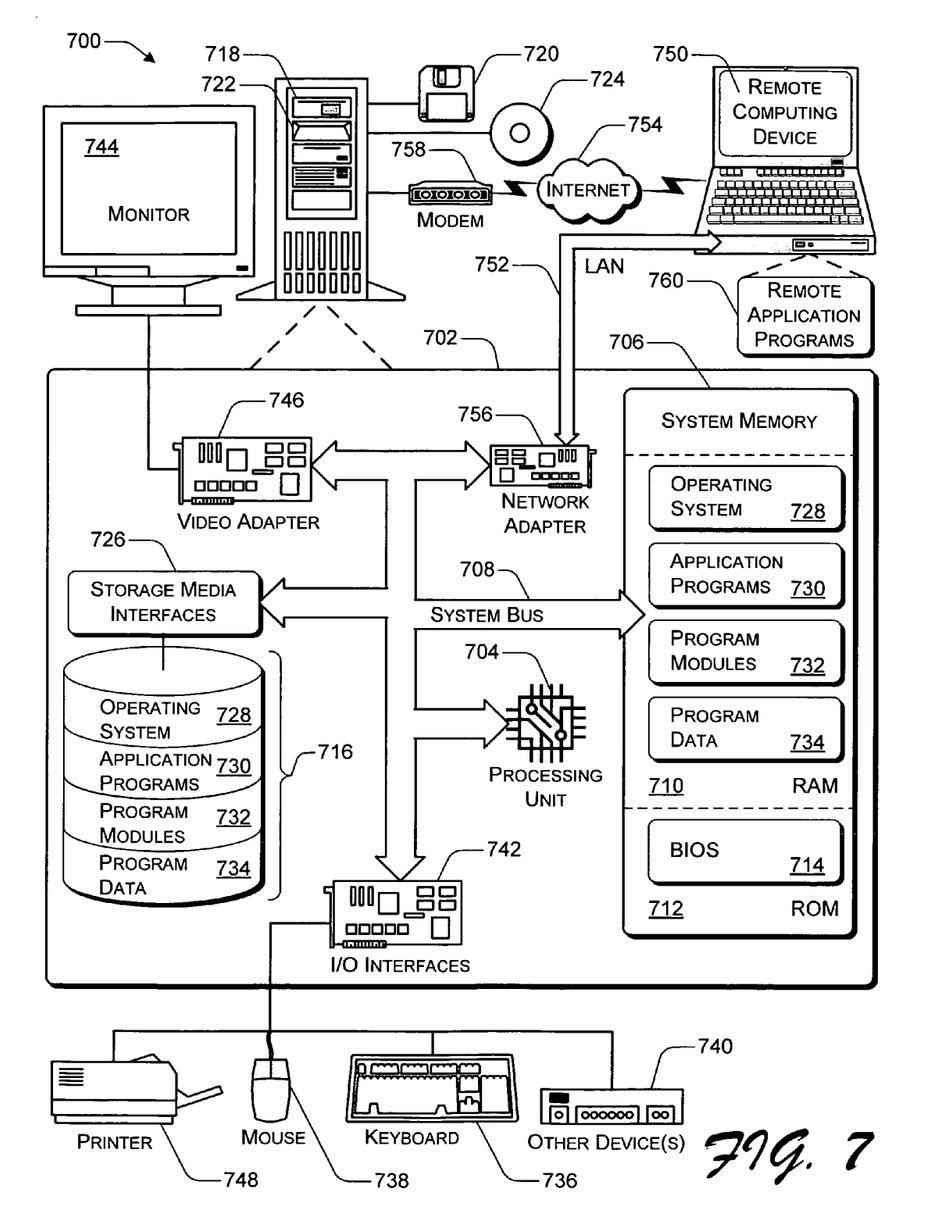
FIG. 7 illustrates an example of a computing (or general device) operating environment that is capable of (wholly or partially) implementing at least one aspect of reclaiming application isolated storage as described herein.

FIG. 7 illustrates an example computing (or general device) operating environment 700 that is capable of (fully or partially) implementing at least one system, device, apparatus, component, arrangement, protocol, approach, method, procedure, media, API, some combination thereof, etc. for reclaiming application isolated storage as described herein. Operating environment 700 may be utilized in the computer and network architectures described below.

Example operating environment 700 is only one example of an environment and is not intended to suggest any limitation as to the scope of use or functionality of the applicable device (including computer, network node, entertainment device, mobile appliance, general electronic device, etc.) architectures. Neither should operating environment 700 (or the devices thereof) be interpreted as having any dependency or requirement relating to any one or to any combination of components as illustrated in FIG. 7.

Additionally, the reclaiming of application isolated storage may be implemented with numerous other general purpose or special purpose device (including computing system) environments or configurations. Examples of well known devices, systems, environments, and/or configurations that may be suitable for use include, but are not limited to, personal computers, server computers, thin clients, thick clients, personal digital assistants (PDAs) or mobile telephones, watches, hand-held or laptop devices, multiprocessor systems, microprocessor-based systems, set-top boxes, programmable consumer electronics, video game machines, game consoles, portable or handheld gaming units, network PCs, minicomputers, mainframe computers, network nodes, distributed or multi-processing computing environments that include any of the above systems or devices, some combination thereof, and so forth.

Implementations for the reclaiming of application isolated storage may be described in the general context of processor-executable instructions. Generally, processor-executable instructions include routines, programs, protocols, objects, interfaces, components, data structures, etc. that perform and/or enable particular tasks and/or implement particular abstract data types. Reclaiming application isolated storage, as described in certain implementations herein, may also be practiced in distributed processing environments where tasks are performed by remotely-linked processing devices that are connected through a communications link and/or network. Especially but not exclusively in a distributed computing environment, processor-executable instructions may be located in separate storage media, executed by different processors, and/or propagated over transmission media.

Example operating environment 700 includes a general-purpose computing device in the form of a computer 702, which may comprise any (e.g., electronic) device with computing/processing capabilities. The components of computer 702 may include, but are not limited to, one or more processors or processing units 704, a system memory 706, and a system bus 708 that couples various system components including processor 704 to system memory 706.

Processors 704 are not limited by the materials from which they are formed or the processing mechanisms employed therein. For example, processors 704 may be comprised of semiconductor(s) and/or transistors (e.g., electronic integrated circuits (ICs)). In such a context, processor-executable instructions may be electronically-executable instructions. Alternatively, the mechanisms of or for processors 704, and thus of or for computer 702, may include, but are not limited to, quantum computing, optical computing, mechanical computing (e.g., using nanotechnology), and so forth.

System bus 708 represents one or more of any of many types of wired or wireless bus structures, including a memory bus or memory controller, a point-to-point connection, a switching fabric, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 702 typically includes a variety of processor-accessible media. Such media may be any available media that is accessible by computer 702 or another (e.g., electronic) device, and it includes both volatile and non-volatile media, removable and non-removable media, and storage and transmission media.

System memory 706 includes processor-accessible storage media in the form of volatile memory, such as random access memory (RAM) 740, and/or non-volatile memory, such as read only memory (ROM) 712. A basic input/output system (BIOS) 714, containing the basic routines that help to transfer information between elements within computer 702, such as during start-up, is typically stored in ROM 712. RAM 710 typically contains data and/or program modules/instructions that are immediately accessible to and/or being presently operated on by processing unit 704.

Computer 702 may also include other removable/non-removable and/or volatile/non-volatile storage media. By way of example, FIG. 7 illustrates a hard disk drive or disk drive array 716 for reading from and writing to a (typically) non-removable, non-volatile magnetic media (not separately shown); a magnetic disk drive 718 for reading from and writing to a (typically) removable, non-volatile magnetic disk 720 (e.g., a "floppy disk"); and an optical disk drive 722 for reading from and/or writing to a (typically) removable, non-volatile optical disk 724 such as a CD, DVD, or other optical media. Hard disk drive 716, magnetic disk drive 718, and optical disk drive 722 are each connected to system bus 708 by one or more storage media interfaces 726. Alternatively, hard disk drive 716, magnetic disk drive 718, and optical disk drive 722 may be connected to system bus 708 by one or more other separate or combined interfaces (not shown).

The disk drives and their associated processor-accessible media provide non-volatile storage of processor-executable instructions, such as data structures, program modules, and other data for computer 702. Although example computer 702 illustrates a hard disk 716, a removable magnetic disk 720, and a removable optical disk 724, it is to be appreciated that other types of processor-accessible media may store instructions that are accessible by a device, such as magnetic cassettes or other magnetic storage devices, flash memory, compact disks (CDs), digital versatile disks (DVDs) or other optical storage, RAM, ROM, electrically-erasable programmable read-only memories (EEPROM), and so forth. Such media may also include so-called special purpose or hard-wired IC chips. In other words, any processor-accessible media may be utilized to realize the storage media of the example operating environment 700.

Any number of program modules (or other units or sets of instructions/code) may be stored on hard disk 716, magnetic disk 720, optical disk 724, ROM 712, and/or RAM 740, including by way of general example, an operating system 728, one or more application programs 730, other program modules 732, and program data 734. These program modules may include storage manager 206, applications 112, associated application isolated storages 202, and so forth.

A user may enter commands and/or information into computer 702 via input devices such as a keyboard 736 and a pointing device 738 (e.g., a "mouse"). Other input devices 740 (not shown specifically) may include a microphone, joystick, game pad, satellite dish, serial port, scanner, and/or the like. These and other input devices are connected to processing unit 704 via input/output interfaces 742 that are coupled to system bus 708. However, input devices and/or output devices may instead be connected by other interface and bus structures, such as a parallel port, a game port, a universal serial bus (USB) port, an infrared port, an IEEE 1394 ("Firewire") interface, an IEEE 802.11 wireless interface, a Bluetooth® wireless interface, and so forth.

A monitor/view screen 744 or other type of display device may also be connected to system bus 708 via an interface, such as a video adapter 746. Video adapter 746 (or another component) may be or may include a graphics card for processing graphics-intensive calculations and for handling demanding display requirements. Typically, a graphics card includes a graphics processing unit (GPU), video RAM (VRAM), etc. to facilitate the expeditious display of graphics and performance of graphics operations. In addition to monitor 744, other output peripheral devices may include components such as speakers (not shown) and a printer 748, which may be connected to computer 702 via input/output interfaces 742.

Computer 702 may operate in a networked environment using logical connections to one or more remote computers, such as a remote computing device 750. By way of example, remote computing device 750 may be a peripheral device, a personal computer, a portable computer (e.g., laptop computer, tablet computer, PDA, mobile station, etc.), a palm or pocket-sized computer, a watch, a gaming device, a server, a router, a network computer, a peer device, another network node, or another device type as listed above, and so forth. However, remote computing device 750 is illustrated as a portable computer that may include many or all of the elements and features described herein with respect to computer 702.

Logical connections between computer 702 and remote computer 750 are depicted as a local area network (LAN) 752 and a general wide area network (WAN) 754. Such networking environments are commonplace in offices, enterprise-wide computer networks, intranets, the Internet, fixed and mobile telephone networks, ad-hoc and infrastructure wireless networks, mesh networks, other wireless networks, gaming networks, some combination thereof, and so forth. Such networks and logical and physical communications connections are additional examples of transmission media.

When implemented in a LAN networking environment, computer 702 is usually connected to LAN 752 via a network interface or adapter 756. When implemented in a WAN networking environment, computer 702 typically includes a modem 758 or other component for establishing communications over WAN 754. Modem 758, which may be internal or external to computer 702, may be connected to system bus 708 via input/output interfaces 742 or any other appropriate mechanism(s). It is to be appreciated that the illustrated network connections are examples and that other manners for establishing communication link(s) between computers 702 and 750 may be employed.

In a networked environment, such as that illustrated with operating environment 700, program modules or other instructions that are depicted relative to computer 702, or portions thereof, may be fully or partially stored in a remote media storage device. By way of example, remote application programs 760 reside on a memory component of remote computer 750 but may be usable or otherwise accessible via computer 702. Also, for purposes of illustration, application programs 730 and other processor-executable instructions such as operating system 728 are illustrated herein as discrete blocks, but it is recognized that such programs, components, and other instructions reside at various times in different storage components of computing device 702 (and/or remote computing device 750) and are executed by processor(s) 704 of computer 702 (and/or those of remote computing device 750).

Although systems, media, devices, methods, procedures, apparatuses, techniques, schemes, approaches, procedures, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as example forms of implementing the claimed invention.

What is claimed is:

1. A hardware device, comprising:
   a first component that traces respective linkages from dedicated storage units to respective identified locations of respective associated executables to determine if the respective associated executables are installed in a memory;
   a second component that (i) deletes the dedicated storage units when the respective associated executables are determined to be not installed in the memory and (ii) permits the dedicated storage units to persist when the respective associated executables are determined to be installed in the memory.

2. The hardware device as recited in claim 1, further comprising a third component that establishes the respective dedicated storage units when the respective associated executables are installed and/or when the respective associated executables request storage space.

3. The hardware device as recited in claim 1, wherein the associated executables are executed in a controlled execution environment.

4. The hardware device as recited in claim 1, further comprising a fourth component that initiates a reclaiming procedure involving the tracing and determining upon at least one of (i) an executable being uninstalled, (ii) at regular time intervals, (iii) manual input by a user of the device, or (iv) a failure of an executable installation because of lack of memory.

5. The hardware device as recited in claim 1, wherein the dedicated storage units comprise executable isolated storage units that provide limited-access rights to the respective associated executables.

6. The hardware device as recited in claim 1, wherein the respective linkages are stored at respective ones of the dedicated storage units, the respective linkages comprising respective pointers to the respective associated executables.

7. The hardware device as recited in claim 1, wherein the linkages are stored in a table having a plurality of entries, each respective entry of the plurality of entries corresponding to a respective one of the dedicated storage units and including a respective linkage.

8. The hardware device as recited in claim 1, wherein the executables comprise applications and/or libraries.

9. The hardware device as recited in claim 1, wherein the device comprises a portable device.

10. The hardware device as recited in claim 1, wherein at least one executable comprises a plurality of assemblies, each respective assembly of the plurality of assemblies associated with a respective dedicated storage unit.

11. A device comprising:
at least one memory, the at least one memory including a plurality of installed executables and a plurality of executable isolated storages, each respective installed executable associated with a respective executable isolated storage; and
a storage manager that is adapted to detect if executables are no longer installed in the at least one memory; wherein the storage manager is further adapted (i) to remove a particular executable isolated storage if the storage manager detects that a particular executable associated therewith is no longer installed in the at least one memory and (ii) to permit a given executable isolated storage to persist if the storage manager detects that a given executable associated therewith is installed in the at least one memory.

12. The device as recited in claim 11, wherein the storage manager is further adapted to detect if respective executables remain installed for associated respective executable isolated storages by tracing respective linkages of a plurality of linkages.

13. The device as recited in claim 12, wherein the plurality of linkages are co-located with each other at a table established by the storage manager, the table including a plurality of entries with each entry corresponding to a respective executable isolated storage and holding a respective linkage.

14. The device as recited in claim 12, wherein each respective linkage is stored at a respective executable isolated storage in a portion thereof that is protected from being accessed by the associated installed executable.

15. The device as recited in claim 12, wherein each respective linkage comprises a pointer reference that is located at a respective executable isolated storage.

16. The device as recited in claim 15, wherein the at least one memory is removable from the device.

17. The device as recited in claim 11, wherein the storage manager is further adapted to initiate and perform a storage reclamation procedure when an executable fails to install due to memory insufficiency.

18. One or more processor-accessible storage media comprising processor-executable instructions that, when executed, direct a device to perform actions comprising:
creating respective linkages between executables and stored data associated therewith; and
tracing the respective linkages to delete the associated stored data of uninstalled executables;
wherein the action of tracing comprises actions of:
extracting references to the executables;
determining if referenced executables is installed in the one or more processor-accessible storage media using the extracted references; and
deleting the associated stored data of executables that are not installed in the one or more processor-accessible storage media.

19. The one or more processor-accessible storage media as recited in claim 18, wherein the action of extracting comprises an action of:
extracting the respective linkages from respective executable isolated storages that also include the associated stored data.

20. The one or more processor-accessible storage media as recited in claim 19, wherein the respective linkages comprise pointer references to respective locations of the executables.

21. The one or more processor-accessible storage media as recited in claim 18, wherein the processor-executable instructions, when executed, direct the device to perform further actions comprising:
installing the executables; and
uninstalling the executables.

22. The one or more processor-accessible storage media as recited in claim 18, wherein at least a portion of the processor-executable instructions comprise at least part of a program that establishes a common language runtime (CLR) environment.

23. The one or more processor-accessible storage media as recited in claim 18, wherein:
at least one executable comprises a plurality of assemblies; and
the action of creating comprises an action of:
creating individual linkages between individual assemblies of the at least one executable and stored data individually associated therewith.

24. An arrangement for reclaiming executable isolated storage, the arrangement including one or more processor-accessible storage media and at least one processor, the arrangement comprising:
linkage means for creating linkages from executable isolated storages to associated executables; and
tracing means for tracing the created linkages to the associated executables; the tracing means including (i) determination means for detecting if respective executables, which are associated with respective executable isolated storages, are not installed present at locations indicated by the created linkages and (ii) removal means for deleting those executable isolated storages that are respectively associated with executables that are not detected to be installed at locations indicated by the created linkages.

25. The arrangement as recited in claim 24, wherein the linkage means comprises:
tabular means for creating entries of a table, each entry corresponding to an executable isolated storage and including a linkage to the associated executable.

26. The arrangement as recited in claim 24, wherein the linkage means comprises:
reference means for creating pointers, which point to the associated executable, at a protected area of each executable isolated storage.

27. The arrangement as recited in claim 24, wherein the linkage means and the tracing means each operate at an assembly level of granularity.

28. The arrangement as recited in claim 24, further comprising:
traversal means for traversing a root tree hierarchy, the traversal means activating the tracing means for each root store of the root tree hierarchy.

29. The arrangement as recited in claim 28, wherein the traversal means is adapted to initiate a reclamation procedure upon at least one of (i) an executable being uninstalled, (ii) at regular time intervals, (iii) manual input by a user of the device, or (iv) a failure of an executable installation because of lack of memory.

30. A method comprising:
traversing a root tree hierarchy for memory of a device;
ascertaining a location of an executable from the root tree hierarchy;

determining if the executable is installed by inspecting the ascertained location;
if the executable is determined to be not installed at the ascertained location, deleting executable-related data that is associated with the executable; and
if the executable is determined to be installed at the ascertained location, continuing the action of traversing without deleting the executable-related data that is associated with the executable.

31. The method as recited in claim 30, wherein the traversing comprises:
enumerating storage roots of the root tree hierarchy;
for each enumerated storage root, enumerating executable root stores; and
for each enumerated executable root store, performing the ascertaining.

32. The method as recited in claim 31, wherein the enumerating storage roots comprises:
enumerating at least one removable media comprising a first storage root and at least one non-removable media comprising a second storage root.

33. The method as recited in claim 31, wherein the enumerating executable root stores comprises:
enumerating executable root stores on a per-executable basis or on a per-assembly basis.

34. The method as recited in claim 30, wherein the ascertaining comprises:
accessing an executable isolated storage corresponding to an executable root store of the root tree hierarchy and associated with the executable; and
extracting a reference comprising the location of the executable from the executable isolated storage.

35. The method as recited in claim 30, wherein the determining comprises:
verifying existence of the executable using a hash value and/or a cryptographic operation.

36. The method as recited in claim 30, wherein the determining comprises:
determining if an application or a library exists by inspecting the ascertained location.

* * * * *